United States Patent [19]

Sasaki et al.

[11] Patent Number: 5,160,672
[45] Date of Patent: Nov. 3, 1992

[54] METHOD FOR PRODUCTION OF HOLLOW FIBER MEMBRANE

[75] Inventors: Masatomi Sasaki; Nobuyoshi Kashiwagi; Hiroki Sakakibara; Makoto Saruhashi, all of Fuji, Japan

[73] Assignee: Terumo Kabushiki Kaisha, Tokyo, Japan

[21] Appl. No.: 358,618

[22] Filed: May 30, 1989

[30] Foreign Application Priority Data

May 30, 1988 [JP] Japan .................. 1-130401
May 18, 1989 [JP] Japan .................. 1-122838

[51] Int. Cl.⁵ .............. B29C 67/20; D01D 5/24; D01F 1/08; D01F 2/00
[52] U.S. Cl. .................. 264/41; 210/500.23; 210/500.29; 264/187; 264/209.1; 264/559
[58] Field of Search .............. 264/558, 559, 209.1, 264/41, 187; 210/500.23, 500.29

[56] References Cited

U.S. PATENT DOCUMENTS

| | | | |
|---|---|---|---|
| 4,284,594 | 8/1981 | Joh et al. | 264/209.1 |
| 4,322,381 | 3/1982 | Joh | 264/209.1 |
| 4,323,627 | 4/1982 | Joh | 428/398 |
| 4,329,383 | 5/1982 | Joh | 264/209.1 |
| 4,342,711 | 8/1982 | Joh et al. | 264/209.1 |
| 4,444,716 | 4/1984 | Aoyagi et al. | 264/209.1 |
| 4,668,396 | 5/1987 | Baurmeister et al. | 210/500.29 |
| 4,741,927 | 5/1988 | Pelger et al. | 427/245 |
| 4,744,932 | 5/1988 | Browne | 264/209.1 |
| 4,872,982 | 10/1989 | Taylor | 210/500.23 |

FOREIGN PATENT DOCUMENTS

| | | |
|---|---|---|
| 362377 | 8/1988 | European Pat. Off. . |
| 2566003 | 6/1984 | France . |
| 57-71408 | 5/1982 | Japan . |
| 57-71409 | 5/1982 | Japan . |
| 57-71410 | 5/1982 | Japan . |
| 57-71411 | 5/1982 | Japan . |
| 61048375 | 8/1984 | Japan . |
| 61-8105 | 1/1986 | Japan . |
| 61-48375 | 3/1986 | Japan . |
| 61-113459 | 5/1986 | Japan . |

*Primary Examiner*—Leo B. Tentoni
*Attorney, Agent, or Firm*—Burns, Doane, Swecker & Mathis

[57] ABSTRACT

A method for the production of a hollow fiber membrane by the steps of discharging a spinning dope through an annular spinning nozzle and, at the same time, introducing a non-coagulating liquid for the spinning dope into the central cavity in a hollow fiber of the spinning dope being discharged, and then introducing the discharged fiber of the spinning dope into a coagulating liquid thereby solidifying the discharged fiber into a hollow fiber membrane, which method is characterized by incorporating a surface modifying agent in said non-coagulating liquid thereby modifying the inner surface behavior of the produced hollow fiber membrane.

16 Claims, 2 Drawing Sheets

METHOD FOR PRODUCTION OF HOLLOW FIBER MEMBRANE

BACKGROUND OF THE INVENTION

Field of the Invention

This invention relates to a method for the production of a hollow fiber membrane. More particularly, it relates to a method for the production of a hollow fiber membrane, which method stably provides a hollow fiber membrane with an improved inner surface behavior.

Description of the Prior Art:

In recent years, numerous kinds of hollow fiber membrane have found utility in various fields. For example, in the therapy of artificial dialysis for patients of renal failure, the hollow fiber membrane such as of regenerated cellulose, particularly cuprammonium regenerated cellulose, has found growing utility as the dialyzer, i.e. a permeable membrane, and has been manifesting highly desirable clinical effects due to outstanding dialyzing property and mechanical strength.

In terms of the surface behavior, however, this hollow fiber membrane can hardly be regarded as fully meeting the purpose of use. In the artificial dialysis mentioned above, for example, the hollow fiber membrane induces coagulation of blood and activation of complement, for example, though variably with the kind of membrane. When the hollow fiber membrane to be used happens to be of the type using a regenerated cellulose which is less susceptible of these phenomena, it has a high possibility of entailing such secondary reactions as the so-called transient hemodialysis leukopenia, i.e. a phenomenon of transient abrupt decrease of leukocytes immediately after the start of dialysis.

In the use of the hollow fiber membrane of this sort, therefore, the practice of modifying the surface behavior thereof to meet the purpose of use has been in vogue. This modification has been often attained by various chemical treatments such as treatment of the produced membrane with a chemical or a coupling agent, deposition on the membrane of a polymer derived from a corresponding monomer, grafting of the membrane surface, and treatment with a surfactant or by various physical treatments such as exposure to ultraviolet light and treatment with plasma. More specifically, for the modification of the surface of a regenerated cellulose membrane, the method which comprises chemically binding an isocyanate prepolymer to the surface of a produced membrane (Japanese Patent Laid-Open SHO 61(1986)-8,105) and the method which comprises coating a produced membrane with a homopolymer of a nitrogen-containing basic monomer or a copolymer of the monomer with other monomer (Japanese Patent Laid-Open SHO 61(1986)-48,375) have been proposed. These methods, however, suffer from poor operational efficiency because the treatments for surface modification are performed after the production of membrane. Moreover, the fact that the membrane has a peculiar form of hollow fiber contributes to the handicap on these methods. The effects of the treatments performed by these methods, therefore, have room for further improvement.

The idea of attaining the surface modification by the use of a modifying agent incorporated in advance in the spinning dope ready for molding of the membrane has been conceived. For example, for the modification of a regenerated cellulose membrane, the method which comprises incorporating in the spinning dope, in addition to the cellulose, a cellulose derivative possessing such a substituent as dialkylaminoalkyl, carboxyalkyl, sulfoalkyl, sulfoaryl, phosphonate alkyl, or sulfonate aryl for the purpose of preparing a modified cellulose possessing a fixed degree of substitution and molding the spinning dope into a hollow fiber membrane has been introduced to the art (Japanese Patent Laid-Open SHO 61(1986)-113,459). The method which effects the surface modification by the incorporation of a modifying agent in the spinning dope as described above, however, is deficient in selectivity of the modifying agent and can hardly be regarded as sufficient in membrane-forming properties and in effect of the treatment. Further, the method of this kind effects the modification not only on the surface of the hollow fiber membrane but also throughout the entire mass of the membrane and still has the possibility of degrading the physical properties of the hollow fiber membrane.

An object of this invention, therefore, is to provide a novel method for the production of a hollow fiber membrane.

Another object of this invention is to provide a method for the production of a hollow fiber membrane, which method permits stable production of a hollow fiber membrane of a modified inner surface behavior.

A further object of this invention is to provide a method for the production of a hollow fiber membrane, which method produces a hollow fiber membrane of an improved inner surface behavior with high operational efficiency and high economy.

SUMMARY OF THE INVENTION

The objects described above are accomplished by a method for the production of a hollow fiber membrane by the steps of discharging a spinning dope through an annular spinning nozzle and, at the same time, introducing a non-coagulating liquid for the spinning dope into the central cavity in a hollow fiber of the spinning dope being discharged, and then introducing the discharged fiber of the spinning dope into a coagulating liquid thereby solidifying the discharged fiber into a hollow fiber membrane, which method is characterized by incorporating a surface modifying agent in the non-coagulating liquid thereby modifying the inner surface behavior of the produced hollow fiber membrane.

The objects described above are accomplished by a method for the production of a hollow fiber membrane by the steps of discharging a spinning dope through an annular spinning nozzle and, at the same time, introducing a non-coagulating liquid for the spinning dope into the central cavity in a hollow fiber of the spinning dope being discharged, and then introducing the discharged fiber of the spinning dope into a coagulating liquid thereby solidifying the discharged fiber into a hollow fiber membrane, which method is characterized by incorporating a surface modifying agent in the non-coagulating liquid thereby modifying the inner surface behavior of the produced hollow fiber membrane, and further immersing the solidified hollow fiber membrane resulting from the treatment for solidification in an organic solvent exhibiting compatibility to both the non-coagulating liquid and the modifying agent.

This invention also discloses a method for the production of a hollow fiber membrane, wherein the polymer for forming the hollow fiber membrane possesses a hydroxyl group, an amino group, or a carboxyl group. This invention further discloses a method for the production of a hollow fiber membrane, wherein the polymer for forming the hollow fiber membrane is regenerated cellulose. This invention further discloses a method for the production of a hollow fiber membrane, wherein the modifying agent is a compound containing a fluorine atom or a nitrogen atom. This invention further discloses a method for the production of a hollow fiber membrane, wherein the modifying agent is a compound possessing an epoxy group or an isocyanate group. This invention further discloses a method for the production of a hollow fiber membrane, wherein the modifying agent is a compound incorporating therein both a hydrophilic moiety and a hydrophobic moiety. This invention further discloses a method for the production of hollow fiber membrane, wherein the non-coagulating liquid contains a hydrophilic organic solvent and/or a surfactant. This invention further discloses a method for the production of a hollow fiber membrane, wherein the hydrophilic organic solvent is a lower alcohol. This invention further discloses a method for the production of a hollow fiber membrane, wherein the surfactant is a nonionic surfactant.

EXPLANATION OF THE PREFERRED EMBODIMENT

This invention, in a method for the production of a hollow fiber membrane by the steps of discharging a spinning dope through an annular spinning nozzle and, at the same time, introducing a non-coagulating liquid for the spinning dope into the central cavity in a hollow fiber of the spinning dope being discharged, and then introducing the discharged fiber of the spinning dope into a coagulating liquid thereby solidifying the discharged fiber into a hollow fiber membrane, attains the modification of the inner surface behavior of the hollow fiber membrane by the incorporation of a modifying agent in the non-coagulating liquid. This method, therefore, is excellent in operational efficiency and advantageous economically because it has virtually no adverse effect on the membrane-forming property during the production of membrane and because it effects the modification of the inner surface behavior simultaneously with the formation of membrane.

The solidified hollow fiber membrane which results from the treatment for coagulation is further immersed in an organic solvent which exhibits compatibility both to the non-coagulating liquid and the modifying agent. The organic solvent dissolves the modifying agent present in the non-coagulating liquid and the resultant solution settles on the inner surface of the membrane and increases the chance for the modifying agent to be bound with the inner surface. Thus, even a modifying agent susceptible of decomposition by an alkali or an acid, such as, for example, a modifying agent containing an ester bond can be easily used without entailing the disadvantage otherwise causable by the decomposition.

Now, this invention will be described in detail below with reference to embodiments.

This invention can be applied effectively to a varying method for the production of a hollow fiber membrane which comprises the steps of discharging a spinning dope through an annular spinning nozzle and, at the same time, introducing a non-coagulating liquid for the spinning dope in the central cavity in the discharged fiber of the spinning dope and subsequently introducing the discharged fiber of spinning dope into a coagulating liquid thereby producing a hollow fiber membrane. This invention is characterized by attaining the modification of the inner surface behavior of a hollow fiber membrane by the incorporation of a surface modifying agent in the non-coagulating liquid.

Figure 1:
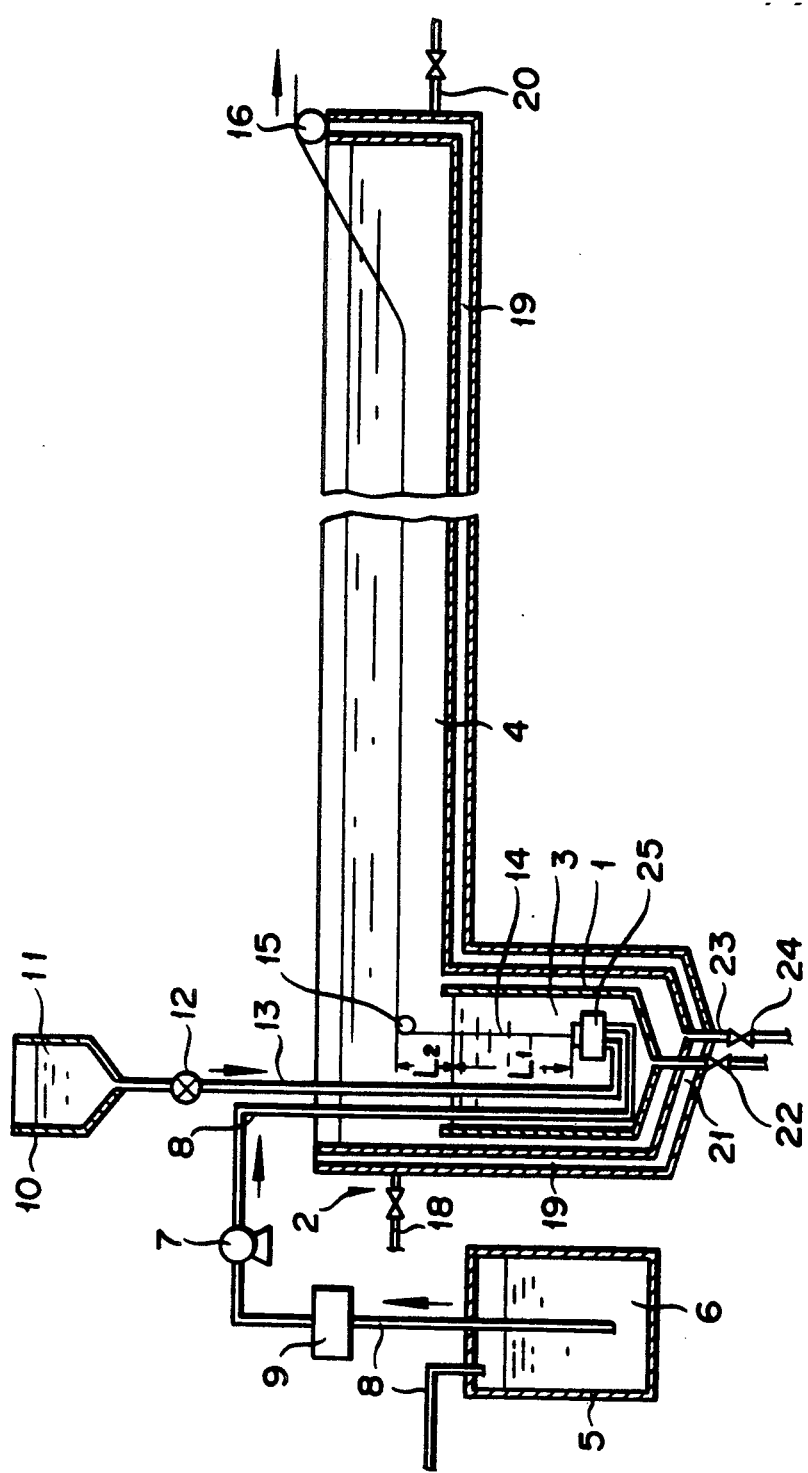
FIG. 1 is a schematic cross section of a typical apparatus to be used in the production of a hollow fiber membrane by a method as one embodiment of this invention.

This invention will be described below with reference to the process for the spinning of regenerated cellulose, for example. In a bath vessel 2 provided in the bottom part thereof with a non-coagulating liquid tank 1 as illustrated in FIG. 1, a non-coagulating liquid 3 for a spinning dope is supplied as a lower layer and a coagulating liquid 4 of a smaller specific gravity than the non-coagulating liquid for the spinning dope is supplied as an upper layer to the non-coagulating liquid tank 1 to form a two-layer bath therein. A spinning dope 6 in a spinning dope storage tank 5 is forwarded under pressure by a pump (such as, for example, a gear pump) 7 through a conduit 8 to a filter 9, passed through the filter 9, and then extruded through an annular spinning nozzle (not shown) disposed as upwardly directed in a spinneret 25 directly into the non-coagulating liquid 3 of the aforementioned lower layer. In this case, a non-coagulating liquid 11 for the spinning dope stored as an inner liquid in an inner liquid storage tank 10 is supplied by virtue of natural head to a flow meter 12, then forwarded through a conduit 13 to the spinneret 25, and introduced and discharged into the central cavity in the annularly extruded fiber of spinning dope 14. In the non-coagulating liquid 11 as the inner liquid, a modifying agent described specifically hereinafter is incorporated. Throughout the entire course of the spinning process, the inner surface of the annularly extruded fiber of spinning dope 14 is kept exposed to the modifying agent and is modified by this modifying agent. The membrane-forming property of the spinning dope is not substantially affected by the modifying agent because it is only the inner surface of the annularly extruded fiber of spinning dope 14 which borders on the non-coagulating liquid 11 that comes into contact with the modifying agent. The annularly extruded fiber of spinning dope 14 through the annular spinning nozzle still containing therein the modifying agent-containing non-coagulating liquid 11 and remaining uncoagulated advances upwardly through the lower layer of non-coagulating liquid 3. In this case, the annular fiber of spinning dope 14 rises in the liquid by virtue of the buoyance due to the difference of specific gravity from the non-coagulating liquid.

Then, this annular fiber of spinning dope 14 rises into the upper layer of coagulating liquid 4. It is deflected by a deflecting bar 15 disposed in the coagulating liquid 4 and consequently allowed to pass amply through the coagulating liquid 4, then lifted out of the upper layer by a roll 16, and forwarded to the next step.

In this case, a constant temperature circulating liquid 19 is supplied through a supply orifice 18 and discharged through a discharge orifice 20 so that the coagulating liquid 4 can be retained at a prescribed temperature such as, for example, a temperature of 20°±2° C. The non-coagulating liquid 3, after the use or during the replacement with a new supply, is discharged through a discharge orifice via a valve 22. At the same time, the coagulating liquid 4, after the use or during the replacement with a new supply, is discharged through a discharge orifice 23 via a valve 24.

The method of this invention for the production of a hollow fiber membrane has been described with reference to the method of floatation of regenerated cellulose described in U.S. Pat. No. 4,444,716. The method of the present invention is not at all limited to this particular manner of embodiment. Even with respect to the method for the spinning of regenerated cellulose, this invention can be embodied in various manners such as resorting to the method which comprises introducing a non-coagulating liquid for the spinning dope into the central cavity in the fiber of spinning dope and discharging the fiber through an annular spinning nozzle into the ambient air, the which, as disclosed in Japanese Patent Laid-Open SHO 57(1982)-71,408 and Japanese Patent Laid-Open SHo 57(1982)-71,410, comprises discharging the spinning dope into the non-coagulating liquid and then causing it to pass through the interface between non-coagulating liquid layer and the coagulating liquid layer, the method which, as disclosed in Japanese Patent Laid-Open SHO 57(1982)-71,409, comprises directly discharging the spinning dope into the non-coagulating liquid and then passing it through the coagulating liquid, and the method which, as disclosed in Japanese Patent Laid-Open SHO 57(1982)-71,411, comprises discharging the spinning dope into an envelope of the non-coagulating liquid and subjecting the discharged fiber to coagulation and regeneration. On the basis of the various well-known methods for the production of a hollow fiber membrane by the steps of discharging the spinning dope through the annular spinning nozzle and, at the same time, introducing the non-coagulating liquid for the spinning dope in the central cavity in the annularly extruded fiber of spinning dope, and then introducing the annularly extruded fiber of spinning dope into the coagulating liquid thereby forming a coagulated membrane, the present invention can be easily embodied by effecting the slight alteration of adding a modifying agent into the non-coagulating liquid which is introduced in the central cavity in the annularly extruded fiber of spinning dope.

The polymer of which the hollow fiber membrane is produced by the method of this invention has no particular restriction except for the sole requirement that it should be capable of being coagulated and allowed to form a membrane by a process which comprises discharging a spinning dope through the annular spinning nozzle and, at the same time, introducing the non-coagulating liquid for the spinning dope in the inner cavity in the annularly discharged fiber of spinning dope, and then introduction of the annularly discharged fiber of spinning dope into the coagulating liquid. Although the hollow fiber membranes formed of various hydrophilic or hydrophobic polymers are embraced by this invention, the hollow fiber membrane of this invention is preferably formed of a polymer possessing a hydroxyl group, an amino group, or a carboxyl group so that the surface modification with the modifying agent will be carried out advantageously. Particularly preferable polymers are regenerated celluloses such as cuprammonium cellulose and a cellulose acetate.

In the method of this invention for the production of a hollow fiber membrane, since the modifying agent is incorporated in the non-coagulating liquid for the spinning dope, the modifying agent for the hollow fiber membrane formed of the polymer is only required to be capable of being uniformly dispersed in the non-coagulating liquid. From a very rich variety of compounds, this modifying agent can be selected to suit the characteristic properties which are preferably imparted to the inner surface of the hollow fiber membrane to be produced. The compound to be used as the modifying agent which is particularly expected to bring about a highly preferable action in the interface between the spinning dope and the non-coagulating liquid and adhere or bind satisfactorily to the inner surface of the produced hollow fiber membrane and manifest preferable properties is desired to possess such a reactive group as an epoxy group or an isocyanate group or combine a hydrophilic moiety and a hydrophobic moiety at the same time. For the treatment to be more effective, the modifying agent is desired to be a compound containing a fluorine atom or a nitrogen atom.

Specifically, the compounds which are usable as the modifying agent of the nature described above include 2-hydroperfluoroethyl glycidyl ether,

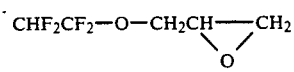

1,1,2,3,3-pentahydroperfluoroundecylene-1,2-oxide,

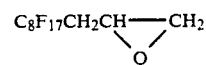

,1,1,2,3,3-pentahydroperfluorononylene-1,2-oxide,

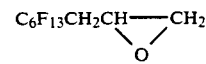

1,1,2,2-tetrahydroperfluorodecanylethylene glycol glycidyl ethers,

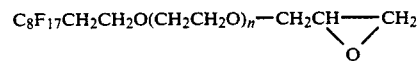

such as 1,1,2,2-tetrahydroperfluorodecanylethylene glycol glycidyl ether, 1,1,2,2-tetrahydroperfluorodecanyldiethylene glycol glycidyl ether, 1,1,2,2-tetrahydroperfluorodecanyltriethylene glycol glycidyl ether, and 1,1,2,2-tetrahydroperfluorodecanylpolyethylene glycol glycidyl ether, glycidyl trimethyl ammonium chloride,

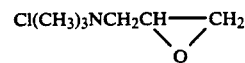

methyl carbamic glycidyl ester,

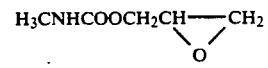

ethyl carbamic glycidyl ester,

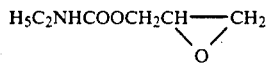

isopropyl carbamic glycidyl ester,

and diethylglycidyl amine,

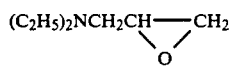

for example.

The non-coagulating liquid to which the modifying agent described above is added cannot be specified because it is variable with the kind of spinning dope to form the hollow fiber membrane. When the spinning dope is of a cellulose type, for example, the compounds which are usable as the non-coagulating liquid include isopropyl myristate, ethylhexyl alcohol, benzene, toluene, xylene, liquid paraffin, n-dodecane, n-hexane, gas oil, isoamyl acetate, and kerosene, for example.

Further, for the purpose of enhancing the solubility of the modifying agent of the nature described above in the non-coagulating liquid, the idea of adding an organic solvent or a surfactant to the non-coagulating liquid may be conceived. In the case of the process for spinning regenerated cellulose, for example, the organic solvent or the surfactant to be added preferably possesses high hydrophilicity or a high boiling point. When the non-coagulating liquid contains a readily vaporizing substance in a large amount, it may cause leaks of the produced hollow fiber membrane during the step of drying. The organic solvent or the surfactant, therefore, is preferably such that it passes into the water layer and ceases to exist in the non-coagulating liquid entrapped in the central cavity in the hollow fiber membrane before the step of drying. When it persists in the central cavity, it is preferably incapable of being readily evaporated. When the organic solvent or the surfactant has a high boiling point, this boiling point is not less than 70° C., preferably not less than 100° C. The surfactants which satisfy these requirements include such nonionic surfactants as polyoxyethylene polyoxypropyl ether, polyoxyethylene alkylallyl ethers, and polyoxyalkyl ethers, for example. The organic solvents which satisfy these requirements include methyl alcohol, ethyl alcohol, acetone, and toluene, for example.

The solidified hollow fiber membrane obtained as described above after the treatment for coagulation is further treated by the conventional method of effecting removal of copper after washing with water, the conventional method of effecting removal of copper after washing with water and further performing a treatment with an alkali after the washing with water, or the conventional method of carrying out the washing with water after the treatment with an alkali and subsequently effecting removal of copper, to give rise to the hollow fiber membrane aimed at.

The method of this invention produces its effect more preferably when the solidified hollow fiber membrane resulting from all of the steps mentioned above is immersed in an organic solvent which exhibits compatibility to both the non-coagulating liquid and the modifying agent. The step of this immersion may be inserted at any desired stage after the treatment for coagulation. For example, (1) the method which comprises passing the fiber of spinning dope through the coagulating liquid as described above, washing it with water, then immersing it in the organic solvent, washing it again with water, and subjecting it to the treatment for removal of copper, (2) the method which comprises passing the fiber of spinning dope through the coagulating liquid, then treating it with an alkali, subsequently immersing it in the organic solvent, washing it again with water, and subjecting it to the treatment for removal of copper and (3) the method which comprises passing the fiber of spinning dope through the coagulating liquid, subjecting to the treatment for removal of copper, washing it with water, then treating it with an alkali, and immersing it in the organic solvent, for example, may be conceivable.

The organic solvent to be used for this immersion is required to possess compatibility both with the non-coagulating liquid and the modifying agent. The organic solvents which meet this requirement include lower alcohols such as ethanol, isopropanol, n-propanol, and butanols, ketones such as acetone, methylethyl ketone, and methylisobutyl ketone, and tetrahydrofuran, dioxane, acetonitrile, dimethylsulfoxide, and dimethyl formamide, for example.

The time of the immersion of the hollow fiber membrane in the organic solvent is only required to be enough for the hollow fiber membrane to be thoroughly impregnated with the solvent. It is difficult to define because it is variable with the kind of solvent to be used, the material for the membrane, and the structure of membrane, for example. It is generally preferably to exceed 10 seconds and more preferably is in the range of 5 to 30 minutes.

The treatment with an alkali is carried out by the conventional method. Generally, the alkali is desired to be sodium hydroxide or potassium hydroxide. The concentration of the alkali used for the treatment is in the range of 0.1 to 15% by weight, preferably 0.1 to 2% by weight. The treatment for removal of copper is also carried out by the conventional method. Generally, this treatment is performed by the immersion in an aqueous solution of sulfuric acid, for example.

Now, the present invention will be described more specifically below with reference to working examples.

EXAMPLE 1

An aqueous cuprammonium solution was prepared by suspending 5,148 g of an aqueous 28% ammonia solution and 864 g of basic copper sulfate in 1,200 ml of water. To this aqueous cuprammonium solution was added 2,725 ml of an aqueous 10% sodium sulfite solution. In the resultant solution, 1,900 g of cotton linter pulp having a polymerization degree of about 1,000 (±100) was stirred and dissolved and 1,600 ml of an aqueous 10% sodium hydroxide solution was added thereto, to give rise to an aqueous cuprammonium cellulose solution (specific gravity 1.08) to be used as a spinning dope.

Separately, in an apparatus configured as illustrated in FIG. 1, trichlorotrifluoroethane was supplied as the non-coagulating liquid 3 to the non-coagulating liquid tank 1 of the bath vessel 2 to form a lower layer therein and then an aqueous sodium hydroxide solution having a concentration of 50 g/lit. was supplied as the coagulating liquid thereto to form an upper layer therein. The spinning dope 6 mentioned above was led from the dope storage tank 5 through the filter 9 to the spinneret 25 having an annular spinning nozzle disposed as directed upwardly therein and then discharged the nitrogen pressure of 2.5 kg/cm² through the spinning nozzle directly into the non-coagulating liquid 3 of the lower layer kept at a temperature of 20°±2° C.

The spinning nozzle had an orifice diameter of 3.8 mm and the spinning dope [cell. 7.4%, 1.750 p (7.5° C.)] was discharged at a rate of 6.47 ml/min. At this time, isopropyl myristate containing 1 w/v % of 1,1,2,2-tetrahydroperfluorodecanyl polyethylene glycol glycidyl ether,

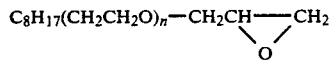

(n is an average of 6.5) as a compound possessing an epoxy group and 1 v/v % of methanol was introduced through a non-coagulating liquid inlet disposed in the spinneret 25 and discharged into the annularly discharged fiber of spinning dope 14 to be occluded therein. The inlet had a diameter of about 1.2 mm and the non-coagulating liquid was discharged at a rate of 2.6 ml/min. Then, the the fiber of spinning dope (containing the non-coagulating liquid) 14 was allowed to ascend in trichlorotrifluorethane and rise through the aqueous sodium hydroxide solution (20°±2° C.) of the upper layer and was then deflected by the deflection bar 15 so as to continue the advance in the horizontal direction. In this case, the height, $L_1$, of the layer of the non-coagulating liquid was 150 mm, the distance, $L_2$, from the interface to the upper end of the deflection bar 15 was 15 mm, and the spinning speed was 60 m/min. Thereafter, the fiber of spinning dope was treated by the conventional method, to produce a hollow fiber.

The hollow fiber thus obtained had an average inside diameter of 220 μm and an average wall thickness of 25 μm. By observation under a scanning electron microscope (produced by Japan Electron Optics Laboratory Co., Ltd. and marketed under product code of "JSM 840"), this hollow fiber was found to possess a homogeneous skinless texture throughout the entire wall thickness including the inner and outer surface regions.

EXAMPLE 2

A hollow fiber was obtained by following the procedure of Example 1, except that isopropyl myristate containing 5 w/v % of 1,1,2-2-tetrahydroperfluorodecanyl polyethylene glycol glycidyl ether and 5 v/v % of methanol was used as the non-coagulating liquid to be occluded in the annularly discharged fiber of spinning dope.

CONTROL 1

A hollow fiber was obtained by following the procedure of Example 1, except that isopropyl myristate was used as the non-coagulating liquid to be occluded in the annularly discharged fiber of spinning dope.

REFERENTIAL EXAMPLE

A glass polymerization tube was charged with 0.25 part of azobis-isobutyronitrile as a polymerization initiator, 12.5 parts of methyl methacrylate, 25 parts of glycidyl methacrylate, and 12.5 parts of hexafluoroisopropyl methacrylate. This polymerization tube was cooled in liquefied nitrogen, evacuated of the entrapped air by a vacuum pump, displaced with nitrogen, evacuated again of the nitrogen, and then melt sealed. This polymerization tube was heated in a constant temperature bath at 60° C. until the contents thereof solidified. Then, the polymerization tube was cooled and opened. The contents were dissolved in tetrahydrofuran and reprecipitated in methanol, to obtain a white polymer A. By the determination of the epoxy group content of this polymer, the glycidyl methacrylate content of this polymer was found to be 43.8% by weight.

EXAMPLE 3

A solidified hollow fiber was obtained by Normann coagulation by following the procedure of Example 1, except that isoamyl acetate containing 0.5 w/v % of the polymer (modifying agent) obtained in Referential Example was used as the non-coagulating liquid. This hollow fiber was washed with water for 12 minutes and then kept immersed in an aqueous 1% sulfuric acid solution for 13 minutes for removal of copper. It was further washed with water for 12 minutes to obtain a hollow fiber. The hollow fiber was kept immersed in an aqueous 0.5% sodium hydroxide solution for 10 minutes. This hollow fiber membrane was further kept immersed in acetone for 15 minutes for surface treatment and subjected to the conventional glycerol treatment, dried, and washed with Fron for thorough removal of the non-coagulating liquid and the modifying agent from within the hollow fiber, to obtain a specimen.

EXAMPLE 4

A hollow fiber membrane was obtained by following the procedure of Example 3, except that the solidified hollow fiber resulting from the Normann coagulation was kept immersed in an aqueous 0.5% sodium hydroxide solution for 10 minutes, kept immersed in ethanol for 15 minutes, washed with water for 12 minutes, and then kept immersed in an aqueous 1% sulfuric acid solution for 13 minutes for removal of copper.

EXAMPLE 5

A hollow fiber membrane was obtained by following the procedure of Example 3, except that the solidified hollow fiber resulting from the Normann coagulation was washed with water for 12 minute then kept immersed in acetone for 15 minutes, washed with water for 1 minutes, and kept immersed in an aqueous 1% sulfuric acid solution for 13 minutes for removal of copper.

CONTROL 2

A hollow fiber membrane was obtained by following the procedure of Example 3, except that isoamyl acetate was used as the non-coagulating liquid to be occluded in the annularly discharged fiber of spinning dope.

Figure 2A:
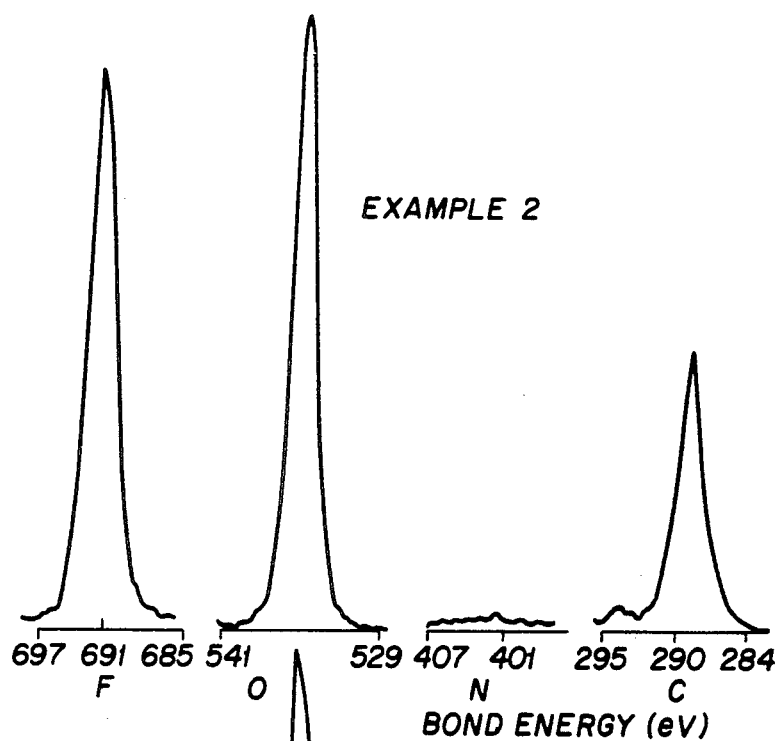
FIGS. 2a-2c are ESCA spectrums of the inner surface of the hollow fiber membrane obtained in the embodiments of Example 2, Example 1 and Control 1, respectively.
Figure 2B:
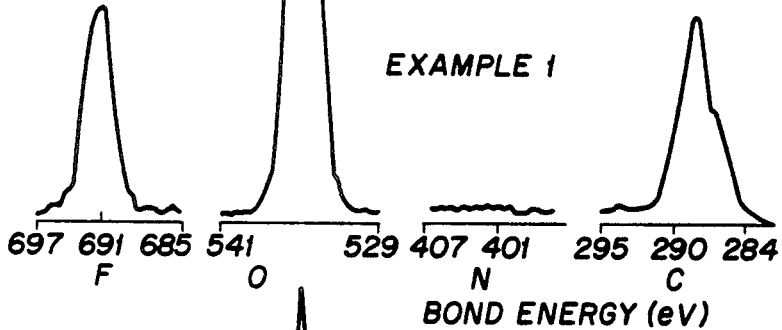
Figure 2C:
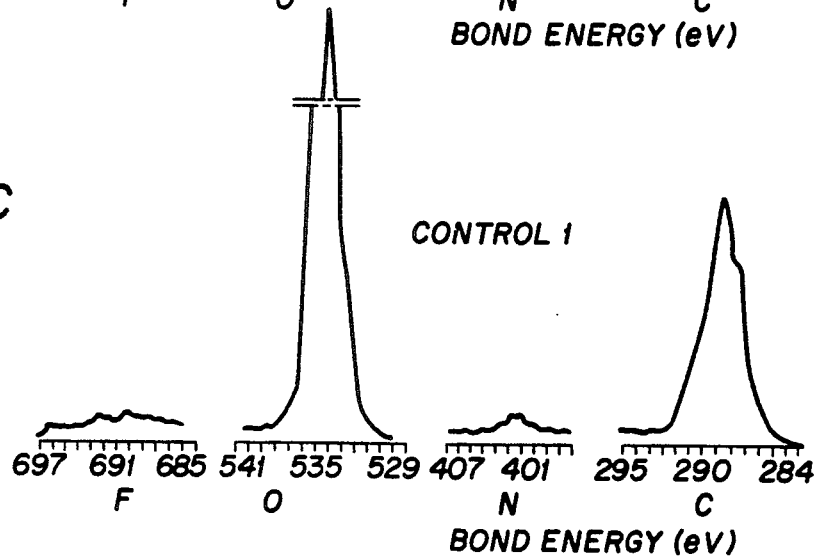

The hollow fiber membranes obtained in Examples 1 to 5 and Controls 1 and 2 were cut open by insertion of a longitudinal slit. The opened membranes were closely arranged side by side, with the formerly inner surfaces thereof turned upwardly, to prepare respective samples 1 cm × 1 cm in surface area. These samples were examined by the method of X-ray photoelectric spectrometry (ESCA: with an instrument made by Japan Electron Optics Laboratory Co., Ltd. and marketed under product code of "JPS 90 SX") to determine the ESCA spectra of atoms on cellulose surface. The results were as shown in FIGS. 2a, 2b and 2c. The ratios of numbers of fluorine atoms were as shown in Table 1.

TABLE 1

|  | Ratio of numbers of fluorine atoms (%) |
| --- | --- |
| Example 1 | 7.0 |
| Example 2 | 14.8 |
| Control 1 | 0.0 |
| Example 3 | 7.6 |
| Example 4 | 7.1 |
| Example 5 | 5.4 |
| Control 2 | 0.0 |

As described above, the present invention concerns a method for the production of a hollow fiber membrane by the steps of discharging a spinning dope through an annular spinning nozzle and, at the same time, introducing a non-coagulation liquid for the spinning dope into the central cavity in a hollow fiber of the spinning dope being discharged, and then introducing the discharged fiber of the spinning dope into a coagulating liquid thereby solidifying the discharged fiber into a hollow fiber membrane, which method is characterized by incorporating a surface modifying agent in the non-coagulating liquid thereby modifying the inner surface behavior of the produced hollow fiber membrane. Thus, this invention proves highly advantageous economically because the modification of the inner surface of the hollow fiber membrane by a very simple procedure. Further, since the modifying agent is incorporated not in the spinning dope but in the coagulating liquid, the effect of the modifying agent on the spinning dope's membrane-forming property can be curbed to the fullest possible extent and the method itself enjoys wide selectivity of the modifying agent.

In the method of this invention for the production of a hollow fiber membrane, when the polymer destined to form the hollow fiber membrane is a compound possessing at least a hydroxyl group, an amino group, or a carboxyl group, preferably regenerated cellulose and the modifying agent is a compound containing a fluorine atom or a nitrogen atom, a compound containing an epoxy group or an isocyanate group, and/or a compound combining both a hydrophilic moiety and a hydrophobic moiety, the modification is attained more fully effectively. When the non-coagulating liquid contains a hydrophilic solvent, preferably a lower alcohol or a surfactant, and more preferably a nonionic surfactant, the method's selectivity of the modifying agent can be enlarged to a greater extent, rendering possible the impartation of desired modification to the inner surface of the produced hollow fiber membrane.

Further, in the method of this invention for the production of a hollow fiber membrane, when the solidified hollow fiber membrane resulting from the treatment of coagulation is immersed in an organic solvent exhibiting compatibility to both the non-coagulating liquid and the modifying agent, the organic solvent dissolves the modifying agent present in the non-coagulating liquid and the resultant solution settles on the inner surface of the membrane and increases the chance of the modifying agent being bound to the inner surface. This immersion in the organic solvent permits use of a modifying agent susceptible of decomposition by an alkali or an acid, such as, for example, a modifying agent containing an ester bond, and eliminates the drawback otherwise causable as described above.

What is claimed is:

1. A method for the production of a hollow fiber membrane by the steps of discharging a spinning dope through an annular spinning nozzle and, at the same time, introducing a non-coagulating liquid for the spinning dope into the central cavity in a hollow fiber of the spinning dope being discharged, and then introducing the discharged fiber of the spinning dope into a coagulating liquid thereby solidifying the discharged fiber into a hollow fiber membrane, which method comprises incorporating a surface modifying agent having both a hydrophilic moiety and a hydrophobic moiety in said non-coagulating liquid thereby modifying the inner surface behavior of the produced hollow fiber membrane.

2. A method according to claim 1, wherein the polymer destined to form said hollow fiber membrane contains at least a hydroxyl group, an amino group, or a carboxyl group.

3. A method according to claim 2, wherein the polymer destined to form said hollow fiber membrane is regenerated cellulose.

4. A method according to claim 1, wherein said modifying agent is a compound containing a fluorine atom or a nitrogen atom.

5. A method according to claim 1, wherein said modifying agent is a compound containing an epoxy group or an isocyanate group.

6. A method according to claim 1, wherein said non-coagulating liquid contains a hydrophilic organic solvent, a surfactant or both.

7. A method according to claim 6, wherein said hydrophilic organic solvent is a lower alcohol.

8. A method according to claim 6, wherein said surfactant is a nonionic surfactant.

9. A method for the production of a hollow fiber membrane by the steps of discharging a spinning dope through an annular spinning nozzle and, at the same time, introducing a non-coagulating liquid for the spinning dope into the central cavity in a hollow fiber of the spinning dope being discharged, and then introducing the discharged fiber of the spinning dope into a coagulating liquid thereby solidifying the discharged fiber into a hollow fiber membrane, which method comprises incorporating a surface modifying agent having both a hydrophilic and a hydrophobic moiety in said non-coagulating liquid thereby modifying the inner surface behavior of the produced hollow fiber membrane and further immersing the solidified hollow fiber membrane resulting from the treatment for solidification in an organic solvent exhibiting compatibility to both the non-coagulating liquid and the modifying agent.

10. A method according to claim 9, wherein the polymer destined to form said hollow fiber membrane contains at least a hydroxyl group, an amino group, or a carboxyl group.

11. A method according to claim 10, wherein the polymer destined to form said hollow fiber membrane is regenerated cellulose.

12. A method according to claim 9, wherein said modifying agent is a compound containing a fluorine atom of a nitrogen atom.

13. A method according to claim 9, wherein said modifying agent is a compound containing an epoxy group or an isocyanate group.

14. A method according to claim 9, wherein said organic solvent for immersion is selected from the group consisting of lower alcohols, ketones, tetrahydrofuran, dioxane, acetonitrile, dimethyl sulfoxide, and dimethyl formamide.

15. A method for the production of a hollow fiber membrane comprises discharging a spinning dope through an annular spinning nozzle and, at the same time, introducing a non-coagulating liquid which incorporates a surface modifying agent having both a hydrophilic moiety and a hydrophobic moiety for the spinning dope into the central cavity, discharging a hollow fiber of the spinning dope, and then introducing the discharged fiber of the spinning dope into a coagulating liquid, thereby solidifying the discharged fiber into a hollow fiber membrane.

16. A method according to claim 1, wherein said hollow fiber membrane is hydrophilic and said surface modifying agent having both a hydrophilic moiety and hydrophobic moiety has a reactive group at the hydrophilic moiety.

* * * * *

UNITED STATES PATENT AND TRADEMARK OFFICE
CERTIFICATE OF CORRECTION

PATENT NO. : 5,160,672

DATED : November 3, 1992

INVENTOR(S) : Masatomi SASAKI et al

It is certified that error appears in the above-identified patent and that said Letters Patent is hereby corrected as shown below:

In Column 10, line 49, delete "minutes" and insert -- minute --.

Signed and Sealed this

Twenty-third Day of November, 1993

Attest:

BRUCE LEHMAN

Attesting Officer       Commissioner of Patents and Trademarks